Oct. 17, 1950   S. E. SCHROEDER   2,526,049
SPINDLE BEARING CONSTRUCTION
Filed May 12, 1944

Inventor
Simon E. Schroeder
BY
Carlson, Pitzner, Hubbard & Wolfe
Attorneys.

Patented Oct. 17, 1950

2,526,049

UNITED STATES PATENT OFFICE 2,526,049

SPINDLE BEARING CONSTRUCTION

Simon E. Schroeder, Ripon, Wis., assignor to Speed Queen Corporation, a corporation of Delaware Application May 12, 1944, Serial No. 535,338

6 Claims. (Cl. 308—70)

The invention relates generally to bearings and more particularly to a bearing construction for a high speed spindle of a machine tool or the like.

The general object of the invention is to provide a novel spindle bearing construction capable of maintaining a high degree of trueness in the operation of the spindle.

Another object is to provide a novel spindle bearing arrangement so that a predetermined clearance between the spindle and the bearing will be attained.

Other objects and advantages will become apparent from the following description, taken in connection with the accompanying drawing, in which.

Figure 1:
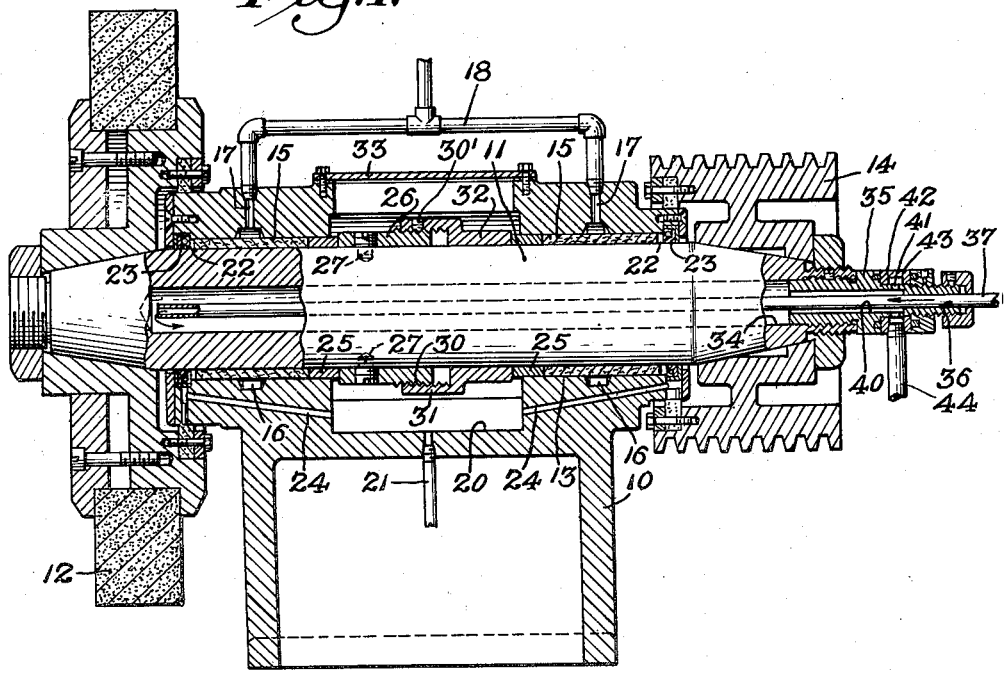
Figure 1 is a vertical sectional view of a spindle bearing construction embodying the features of the invention.

While the invention is susceptible of various modifications and alternative constructions, I have shown in the drawings and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

In machine tools. the accuracy of the work performed thereby is dependent upon the accuracy of operation of the spindle carrying either the tool or the work as the case may be. It is therefore the constant aim of machine tool designers, as well as designers of kindred products, to provide a bearing construction for such spindles, particularly those operating at relatively high speeds, which accurately maintains the spindle in the desired position during operation both by providing for a minimum of clearance between the spindle and bearing structure and by preventing distortion from overheating of the spindle. One instance of a spindle and bearing structure of the character contemplated is a spindle which supports the grinding wheel in a grinding machine. A grinding wheel spindle is one which is driven at relatively high speed, and the work performed by the grinding wheel requires the utmost accuracy attainable. I have therefore shown a grinding wheel spindle bearing construction as an illustrative embodiment of my invention.

The embodiment shown in the drawing comprises a support or head 10 carrying a spindle 11 on one end of which may be mounted a grinding wheel 12. The head or support 10 is adapted to be mounted upon a base or frame (not shown) of a machine. The spindle 11 is located in a longitudinal bore 13 extending through the support 10, the spindle extending beyond both ends of the bore 13 to support the grinding wheel 12 at one end and a driving means such as a pulley 14 at the other end.

Within the bore 13 is located bearing structure supporting the spindle and of such character as to provide lubrication over substantially the entire area of the bearing surfaces. With such complete lubrication, the clearance between the bearing surfaces of the spindle and the bearing structure may be reduced to a minimum without danger of overheating the parts during operation. To this end the invention contemplates the use of a bearing member made of porous metal, and the provision of means to supply oil to the bearing member under pressure so that the porosity of the bearing member permits the oil to be forced therethrough to substantially the entire area of the bearing surface. Thus the bearing surface supporting the spindle is subjected to substantially complete lubrication not dependent upon the clearance between the spindle and the bearing member. Such clearance may therefore be held to a minimum without interfering with proper lubrication, and a high degree of trueness in the rotation of the spindle is thereby obtained.

In the preferred embodiment shown in the drawings, a pair of axially spaced annular bearing members 15 are provided. These are made of porous metal such as sintered bronze or metal known in the trade as Oilite Bearing Bronze, the bearing members 15 having a press fit within the bore 13 of the head, and the interior annular surfaces of the bearing members supporting the spindle 11.

To lubricate the bearing members, the head 10 is provided with a pair of annular grooves 16 opening into the bore 13. The grooves 16 are located intermediate the ends of the respective bearing members 15 so that they are closed thereby to provide annular wells extending about the bearing members. To supply oil to the bearing members, each of the grooves 16 is in communication with a radial passage 17, and the latter are connected to a source of oil under pressure (not shown) by means of piping 18. Thus oil under pressure is supplied to each groove 16 and because of the porosity of the bearing member, the oil permeates the entire body thereof and is forced therethrough to the bearing surface throughout substantially its entire area.

Excess oil working out from the ends of each bearing member is collected and returned to the source of supply. To this end a central well 20 is provided in the head 10 between the two bearing members so that oil working through to the inner ends of the bearing members is collected in the well 20 and carried back to the source of supply through a pipe 21. At the outer ends of the bearing members are annular wells 22 closed by sealing rings 23. The wells 22 communicate at their lower ends with drain passages 24 slanting downwardly toward and opening into the central well 20. Thus excess of oil forced through the bearing members 15 is conducted back to the source of supply.

Although the grinding wheel 12 is utilized for peripheral grinding and the bearing construction consequently is designed primarily for radial load, the spindle 11 must be held against endwise movement. In this respect the bearing members 15 which have a press fit within the head 10 are utilized to hold the spindle against endwise movement. To this end a pair of thrust rings 25 are mounted within the bore 13 in abutment with the inner ends of the respective bearing members 15, and between the thrust rings is an adjustable collar means adapted to be rigidly secured to the spindle and abutting endwise against the two thrust rings 25. To provide space for the adjustable collar means, the central well 20 is sufficiently enlarged.

In the preferred form, the adjustable collar means comprises a ring 26 fitting snugly on the spindle and adapted to be rigidly secured thereto as by set screws 27. The ring 26 abuts endwise against one of the thrust rings 25 and is threaded as at 30 to receive a flange 31 on a collar 32 likewise snugly fitting the spindle. The collar 32 abuts endwise against the other thrust ring 25. Thus by properly adjusting the flange 31 on the ring 26 the collar means is held in endwise abutment with the two thrust rings 25, and since the ring 26 is secured to the spindle, the latter is held against endwise movement relative to the bearing members 15. The flange 31 is adapted to be rigidly secured to the ring 26 when in adjusted position by means of a set screw 30'. The ring 26 and collar 32 are adapted to be placed in position within the head 10 by extending the well 20 upwardly to open through the top of the head 10. When the parts are properly adjusted, such upper opening of the well 20 is closed by means of a removable cover plate 33.

Figure 2:
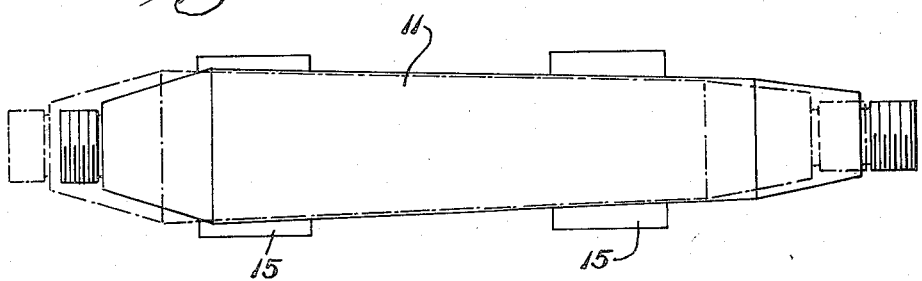
Fig. 2 is a diagrammatic view illustrating the method of assembling the spindle within the bearing structure.

As mentioned above, lubrication of the bearing surfaces is not dependent upon the amount of clearance between the spindle and the bearing members 15. For this reason such clearance may be of a predetermined size. To obtain such clearance the internal bearing surfaces of the members 15 and the external surface of the spindle are ground to a slight taper, as indicated in Fig. 2. In assembling the structure, the spindle is inserted endwise into the bearing members and forced therein until the taper causes the bearing surfaces to fit tightly. Such position is shown by the full lines in Fig. 2. When the spindle is in such position there is substantially no clearance between the spindle and bearing members. The spindle is then moved back a predetermined distance which, because of the known angle of taper, provides a predetermined clearance between the spindle and bearing members. Such position is shown in dotted lines in Fig. 2. The spindle is then locked against endwise movement by means of the ring 26 and collar 32 so that the clearance will thereby be maintained.

As an example of the amount of clearance obtained in this manner for a grinding wheel spindle, such as is illustrated in the drawings, the taper of the coacting bearing surfaces of the bearing members and spindle may be .0005 of an inch. The spindle is preferably moved back from its tight fitting position one-half of an inch, which results in a clearance on each side of the spindle of .00025 of an inch.

The complete lubrication of the bearing surfaces effected by forcing the oil through the porous bearing members 15 will prevent to a great extent any overheating during operation. However, it is desirable to be sure that the spindle is maintained at a fairly constant temperature so that there will be no inaccuracy of grinding resulting therefrom. To this end the spindle is water cooled by a constantly flowing stream of water entering an internal bore in the spindle. As shown herein, the bore, indicated at 34, opens outwardly through the end of the spindle opposite to that carrying the grinding wheel. Threaded into the open end of the bore is a plug 35. The latter is likewise provided with a bore which at its outer end, indicated at 36, is of such size as to fit snugly around a pipe 37. The pipe 37 is connected to a water supply (not shown). Within the bore 34 the pipe extends substantially to the inner end thereof, being spaced a slight distance from such inner end to permit passage of the water from the pipe into the bore 34. To carry the water away from the interior of the spindle, the bore in the plug 35 is enlarged as at 40 to communicate with radial passages 41 through the plug to an annular groove 42 in a collecting ring 43. The collecting ring 43 is mounted externally on the plug 35 and is held against rotation with the plug. The annular groove 42 communicates with a drain pipe 44 threaded radially into the collecting ring 43. Thus water flowing through the pipe 37 cools the interior of the spindle during its passage through the bore 34 and is drained off through the pipe 44. The water thus carries away any heat that might be generated during operation of the spindle.

From the foregoing, it will be apparent that I have provided a spindle bearing construction in which the entire area of the bearing surfaces on the spindle and bearing members is lubricated in a novel manner. The porosity of the metal permits the oil under pressure to permeate throughout the bearing members and thus lubricate substantially the entire bearing surface thereof. Such lubrication is not dependent upon the amount of clearance between the spindle and the bearing members so that such clearance may be held to a predetermined minimum. To set the spindle for such minimum clearance the taper grinding of the bearing surfaces permits the spindle to be shifted to a position relative to the bearing members that will provide the desired clearance. The spindle when so shifted is held against endwise movement relative to the bearing members so that the clearance is maintained throughout operation. Lubrication in this manner substantially prevents overheating of the spindle and the spindle itself is water cooled so that excess heat, should any arise, will be carried away.

I claim as my invention:

1. A spindle bearing construction comprising, in combination, a support having a longitudinal bore extending therethrough, a pair of axially spaced annular bearing members mounted in said bore, a spindle mounted in said bearing members, said bore being enlarged intermediate the bearing members, an adjustable collar means located on said spindle within the enlarged portion of the bore and bearing endwise against said bearing members, said bearing members and said spindle having slightly tapered coacting bearing surfaces, said spindle being longitudinally positioned a predetermined distance from the position where it fits tightly within said bearing members to provide a predetermined clearance between the bearing surfaces, said collar means being locked to said spindle to hold it against axial movement relative to the bearing members.

2. A spindle bearing construction comprising, in combination, a support having a longitudinal bore extending therethrough, a pair of axially-spaced annular bearing members mounted in said bore, a spindle mounted in said bearing members, said bore being enlarged intermediate said bearing members, and an axially shiftable and axially extensible and contractible collar adjustably secured to said spindle within said enlarged portion of said bore and bearing endwise against said bearing members, said bearing members and said spindle having slightly tapered coacting bearing surfaces, said spindle being longitudinally positioned by said collar a predetermined distance from the position where it fits tightly within said bearing members to provide a predetermined clearance between the bearing surfaces.

3. A spindle bearing construction comprising, in combination, a support having a longitudinal bore extending therethrough and enlarged intermediate its ends, a pair of axially-spaced annular bearing members mounted in the opposite end portions of said bore, a spindle mounted in said bearing members, adjustable means on said spindle within the said enlarged portion of said bore and coacting with said support to locate said spindle adjustably in different relative axial positions and to constrain said spindle against endwise movement in any selected position of adjustment, said bearing members and said spindle having slightly tapered coacting bearing surfaces, said spindle being longitudinally positioned a predetermined distance from the position where it would fit tightly within said bearing members so as to provide a predetermined clearance between said bearing surfaces.

4. A spindle bearing construction comprising, in combination, a support having a bore therein, an annular bearing member tightly secured in said bore, a spindle extending through said bearing member, said spindle and bearing member having slightly tapered coacting bearing surfaces, said support being provided with two opposed shoulders spaced axially of said spindle, and an axially extensible and contractible adjusting collar secured to said spindle between said shoulders, said collar including a first ring slidable on said spindle and adapted to be rigidly secured thereto in different positions of axial adjustment and for engagement against one of said shoulders, and a second ring slidable on said spindle and adjustably threaded on said first ring and adapted to be secured thereto in position of adjustment and for engaging the other of said shoulders, whereby said collar is adjustable to locate said spindle against endwise movement in different axial positions relative to said bearing member so as to maintain a predetermined clearance between said bearing surfaces.

5. A spindle bearing construction comprising, in combination, an annular bearing member having an internal bearing surface with a slight predetermined taper, a spindle having an external bearing surface with a taper complemental to said first-mentioned taper and adapted to be inserted axially in one direction into said bearing member to a point where said spindle fits tightly with said bearing member, and an axially extensible and contractible collar slidably adjustable on said spindle and adapted to coact endwise with said bearing member to constrain said spindle against endwise movement in an axial position of adjustment so as to afford a predetermined clearance between said surfaces.

6. A spindle bearing construction comprising, in combination, a bearing support, a pair of axially spaced annular bearing members mounted in said support, means in said support defining two opposed shoulders spaced axially of said bearing members, a spindle extending through and journalled in said bearing members, an axially extensible and contractible adjusting collar secured to said spindle between said shoulders, said collar being axially adjustable in position on said spindle to locate said spindle in a predetermined axial position and being extensible and contractible to take up the space between said shoulders and engage said shoulders to constrain said spindle against axial movement in the axial position of adjustment.

SIMON E. SCHROEDER.

REFERENCES CITED

The following references are of record in the file of this patent:

UNITED STATES PATENTS

| Number | Name | Date |
| --- | --- | --- |
| 1,257,773 | Wiberg | Feb. 26, 1918 |
| 1,437,560 | Shearer | Dec. 5, 1922 |
| 1,550,834 | Miller | Aug. 25, 1925 |
| 1,873,146 | Patch | Aug. 23, 1932 |
| 2,080,750 | Thompson | May 18, 1937 |
| 2,319,740 | Lapsley | May 18, 1943 |
| 2,266,968 | Hamilton | Dec. 23, 1941 |

Certificate of Correction

Patent No. 2,526,049                                                October 17, 1950

SIMON E. SCHROEDER

It is hereby certified that error appears in the printed specification of the above numbered patent requiring correction as follows:

Column 6, line 63, list of references cited, after "Dec. 23, 1941" insert the following:

*OTHER REFERENCES*

*Product Eng'g, Oct. 1932, page 407. Published by McGraw Hill Publishing Co.* and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*